(12) United States Patent
Ozawa

(10) Patent No.: US 6,838,385 B2
(45) Date of Patent: Jan. 4, 2005

(54) METHOD FOR MANUFACTURING ELECTRIC CAPACITANCE TYPE ACCELERATION SENSOR

(75) Inventor: Nobuo Ozawa, Tokyo (JP)

(73) Assignee: Oki Electric Industry Co., Ltd., Tokyo (JP)

(*) Notice: Subject to any disclaimer, the term of this patent is extended or adjusted under 35 U.S.C. 154(b) by 247 days.

(21) Appl. No.: 10/283,060

(22) Filed: Oct. 30, 2002

(65) Prior Publication Data

US 2003/0235992 A1 Dec. 25, 2003

(30) Foreign Application Priority Data

Jun. 21, 2002 (JP) ........................................ 2002-182023

(51) Int. Cl.[7] .............................................. H01L 21/302
(52) U.S. Cl. ...................... 438/704; 438/745; 438/753; 73/514.32
(58) Field of Search .............................. 438/704, 745, 438/753, 756; 73/504–514

(56) References Cited

U.S. PATENT DOCUMENTS

| | | | |
|---|---|---|---|
| 4,574,327 A | * 3/1986 | Wilner | ...................... 361/283.4 |
| 4,719,538 A | 1/1988 | Cox | |
| 5,470,797 A | 11/1995 | Mastrangelo | |
| 5,511,428 A | * 4/1996 | Goldberg et al. | ............. 73/777 |
| 5,569,852 A | * 10/1996 | Marek et al. | ............ 73/514.32 |
| 5,633,552 A | * 5/1997 | Lee et al. | ................... 310/311 |
| 5,677,965 A | 10/1997 | Moret et al. | |
| 5,721,377 A | * 2/1998 | Kurle et al. | ............. 73/504.12 |
| 6,201,284 B1 | * 3/2001 | Hirata et al. | ................ 257/415 |

FOREIGN PATENT DOCUMENTS

| | | |
|---|---|---|
| JP | 10-173204 | 6/1998 |
| JP | 2000-022168 | 1/2000 |
| JP | 2000-298139 | 10/2000 |

* cited by examiner

Primary Examiner—Kin-Chan Chen
(74) Attorney, Agent, or Firm—Rabin & Berdo, P.C.

(57) ABSTRACT

This invention provides a method for manufacturing an electric capacitance type acceleration sensor capable of achieving high productivity in which a semiconductor manufacturing process is used. More specifically, this invention provides a method for manufacturing an electric capacitance type acceleration sensor comprising the steps of: forming a p-type low resistance layer 12 for diffusing thermally a boron ion by implanting the boron ion into the surface of an n-type single crystal silicon 11; etching the p-type low resistance layer 12 to leave a beam part 24 and a part 27 to be a movable electrode; forming a silicon oxide layer 13 to be a sacrificial film, a fixed electrode layer 15 and a silicon nitride film layer 17 on the surface of the silicon substrate 11; etching anisotrophically from the rear surface of the silicon substrate by KOH solution making the p-type low resistance layer stop etching; and forming a hollow layer 19 by removing the silicon oxide film 16 by using a hydrofluoric acid solution from the rear surface of the silicon substrate.

6 Claims, 3 Drawing Sheets

METHOD FOR MANUFACTURING ELECTRIC CAPACITANCE TYPE ACCELERATION SENSOR

BACKGROUND OF THE INVENTION

1. Field of the Invention

The present invention relates to a method for manufacturing an electric capacitance type acceleration sensor in which a silicon substrate is used.

2. Description of the Related Art

An electric capacitance type acceleration sensor is a sensor for detecting an acceleration as a hollow layer (hereafter, referred to as a "gap") between an electrode formed on a fixed substrate (hereafter, referred to as a "fixed electrode" and an electrode formed on a substrate with flexibility (hereafter, referred to as a "movable electrode" changes in response to the acceleration.

The sensor comprises a flexible substrate comprising a weight part for sensing the acceleration, a beam part with flexibility and a supporting part for supporting the weight part through the beam part and comprises a fixed substrate with recess part arranged to cover the weight part on the upper surface of the flexible substrate. The fixed substrate and the flexible substrate are joined to each other at the supporting part of the flexible substrate. The fixed electrode is formed on the plane on the recess part of the fixed substrate opposing to the weight part of the fixed electrode. The movable electrode is formed on the plane on the weight part of the flexible electrode opposing to the fixed electrode.

If a force from the outside is applied by acceleration, the gap between the movable electrode and the fixed electrode changes as the flexible substrate bows. The change of the gap causes a change of the electric capacitance between the electrodes. The acceleration can be measured by detecting the change of the electric capacitance.

In a conventional electric capacitance type acceleration sensor, the flexible substrate is formed by a silicon substrate, and the fixed substrate is formed by a borosilicate glass substrate. In addition, the silicon substrate and the borosilicate glass substrate are anodically joined to each other.

In the conventional electric capacitance type acceleration sensor, however, although the flexible substrate formed by the silicon substrate can be manufactured in a semiconductor manufacturing line, the fixed substrate formed by the borosilicate glass substrate cannot be formed in the same. So the fixed substrate needs to be manufactured in another manufacturing line since the silicon substrate and the like are to be contaminated by impurities from the glass in processing the glass and joining the fixed electrode anodically. Therefore, the cost of equipment becomes high due to the another manufacturing line conventionally.

Also, since the gap is conventionally formed in the early stage, the gap becomes damaged in some cases with a mechanical shock, a stress in forming a film, and so on. This lowers the yield of product.

SUMMARY OF THE INVENTION

The present invention has been achieved in view of aforementioned problems. The object of the present invention is to provide a novel and improved method for manufacturing an electric capacitance type acceleration sensor capable of achieving high productivity with the following structure. A silicon substrate integrated with the flexible substrate is used instead of the borosilicate glass substrate containing impurities in the fixed substrate. Consequently, the electric capacitance type acceleration sensor in the present invention can be manufactured in a normal semiconductor manufacturing line without using the anodic junction and preparing another manufacturing line. Also, since the gap is formed in the final stage, the gap does not become damaged with a mechanical shock, a stress in forming a film, and so on.

In the aspect of the present invention to achieve the above object, there is provided a method for manufacturing an electric capacitance type acceleration sensor comprising the steps of: forming a p-type low resistance layer for diffusing thermally a boron ion by implanting the boron ion into the surface of a silicon substrate; etching the p-type low resistance layer to leave a beam part and a part to be a movable electrode; forming a silicon oxide layer to be a sacrificial film, a fixed electrode layer and a silicon nitride film layer on the surface of the silicon substrate; etching anisotrophically from the rear surface of the silicon substrate by KOH solution making the p-type low resistance layer stop etching; and forming a hollow layer by removing the silicon oxide film by using a hydrofluoric acid solution from the rear surface of the silicon substrate.

BRIEF DESCRIPTION OF THE DRAWINGS

The above and other features of the invention and the concomitant advantages will be better understood and appreciated by persons skilled in the field to which the invention pertains in view of the following description given in conjunction with the accompanying drawings which illustrate preferred embodiments.

DETAILED DESCRIPTION OF THE PREFERRED EMBODIMENTS

Figure 1A:
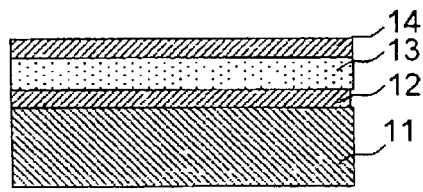
FIGS. 1(a)–(g) are schematic sectional views showing the steps of manufacturing an electric capacitance type acceleration sensor in the first embodiment of the present invention.

Hereinafter, the preferred embodiment of the present invention will be described in reference to the accompanying drawings. Same reference numerals are attached to components having same functions in following description and the accompanying drawings, and a description thereof is omitted.

(First Embodiment)

The first embodiment of the present invention will be explained in reference to FIGS. 1 and 2. FIGS. 1(a)–(g) are schematic sectional views showing the steps of manufacturing an electric capacitance type acceleration sensor in the first embodiment of the present invention. In this embodiment, a flexible substrate (hereafter, referred to as a "silicon substrate 11") is made of an n-type single crystal silicon. First, a boron ion is implanted into the surface of the silicon substrate 11 to diffuse the boron ion thermally into the surface of the silicon substrate by providing the silicon substrate with a heat treatment. A diffusion layer is a p-type low resistance layer 12.

Figure 2:
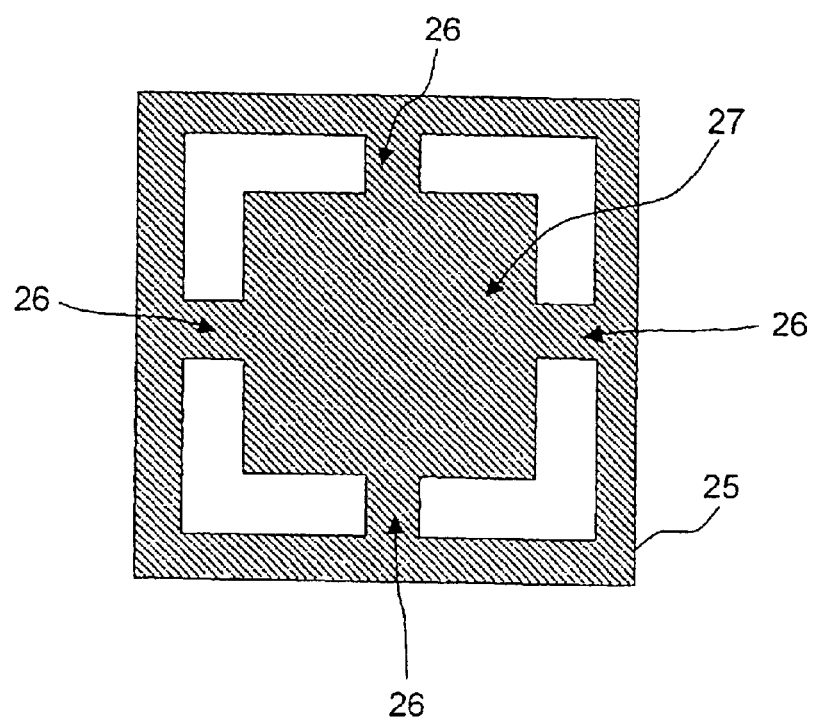
FIG. 2 is the first photoresist pattern in the first and second embodiments.

Next, the surface of the p-type low resistance layer 12 is etched to a predetermined thickness by using the first photoresist as a mask shown in FIG. 2 which is patterned so that a beam part (26 in FIG. 2) and a movable electrode formation part (27 in FIG. 2) can be left. Then a silicon oxide film 13 to be a sacrificial film is formed on the silicon substrate 11, and a polysilicon film (low resistance layer) 14 in which impurities for lowering the resistance of the fixed electrode are doped is formed on the silicon oxide film 13 (FIG. 1(a)).

Figure 1E:
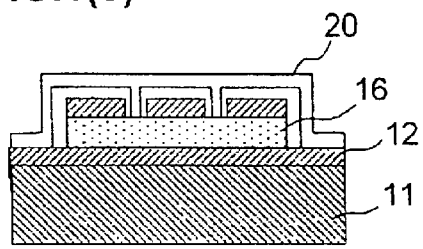
Figure 1B:
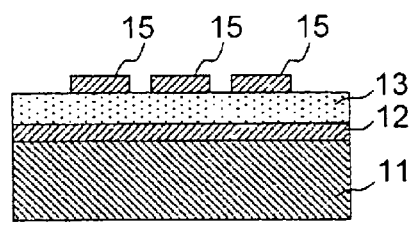
Figure 1F:
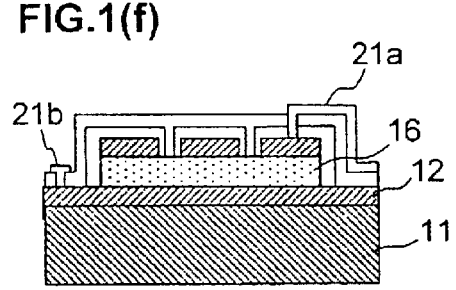

The low resistance layer 14 is etched by using the second photoresist as a mask (not shown) patterned in a predetermined shape, and the second photoresist is removed by plasma ashing to form a fixed electrode 15 (FIG. 1(b)).

Figure 1C:
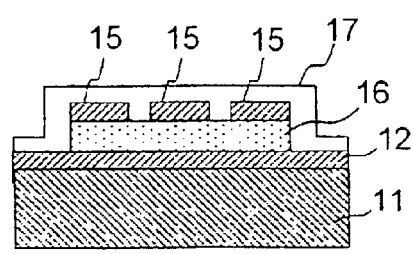
Figure 1G:
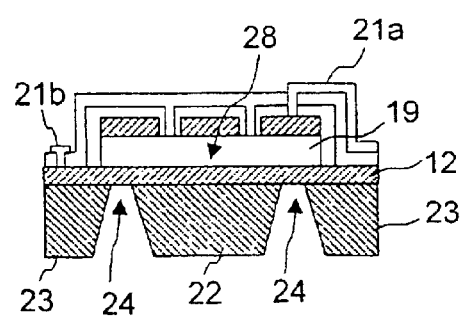

The peripheral part of the silicon oxide film 13 is etched by using the third photoresist as a mask (not shown) patterned in a predetermined shape, and the third photoresist is removed by plasma ashing to form a gap pattern 16, on which the first silicon nitride film 17 is formed (FIG. 1(c)).

Figure 1D:
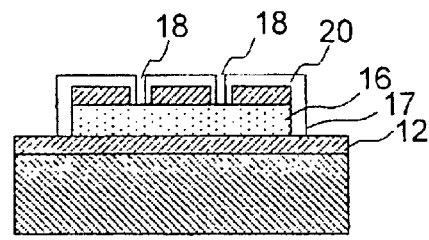

The first silicon nitride film 17 is etched by using the fourth photoresist as a mask (not shown) patterned in a predetermined shape, and the fourth photoresist is removed to form the first piercing pattern 18 reaching the gap pattern 16 (FIG. 1(d)).

In the next, the second silicon nitride film 20 is formed (FIG. 1(e)).

The second silicon nitride film 20 is etched by using the fifth photoresist as a mask (not shown) patterned in a predetermined shape to form the second and the third piercing patterns for connecting the fixed electrode 15 and the movable electrode 12 to each of the metal wiring on the upper layer thereof, and to form the metal film. Then the metal film is etched by using the sixth photoresist as a mask (not shown) patterned in a predetermined shape, and the sixth photoresist is removed to form the metal wiring and pad patterns 21a and 21b (FIG. 1(f)).

Then a CVD oxide film is formed on the rear surface of the silicon substrate 11 and etched by using the seventh photoresist as a mask (not shown) patterned in a predetermined shape, and the seventh photoresist is removed. And then the silicon substrate is etched anisotrophically by KOH solution from the rear surface of the silicon substrate by using the patterned CVD oxide film as a mask to form a weight part 22, a beam part 24, a supporting part 23 and a movable electrode 28. Using the KOH solution, as known well, the etching stops automatically with the p-type low resistance layer 12 as an etch-stop on which the boron ion is diffused.

Finally, a gap (hollow layer) 19 is formed by removing the gap pattern (sacrificial film) 16 by a hydrofluoric acid solution from the rear surface of the silicon substrate 11. Thereby an electric capacitance type acceleration sensor according to this embodiment is completed (FIG. 1(g)).

According to the first embodiment as described above, since the gap is formed from the rear surface of the substrate in the final stage of all steps, the gap does not become damaged during the steps with a mechanical shock, a stress in forming a film, and so on, compared with forming the gap in the early stage. This enhances the yield of product.

(Second Embodiment)

The second embodiment of the present invention will be explained in reference to FIGS. 2 and 3. FIGS. 3(a)–(g) are schematic sectional views showing the steps of manufacturing an electric capacitance type acceleration sensor in the second embodiment of the present invention. In this embodiment, a flexible substrate (hereafter, referred to as a "silicon substrate 41") is made of an n-type single crystal silicon. First, a boron ion is implanted into the surface of the silicon substrate 41 by using the first photoresist as a mask (FIG. 2), the same as the one in the first embodiment, which is patterned so that a beam part 52 and a movable electrode formation part 57 can be left to diffuse the boron ion thermally into the surface of the silicon substrate by providing the silicon substrate with a heat treatment. A diffusion layer is a p-type low resistance layer 12 with high boron density.

Figure 3A:
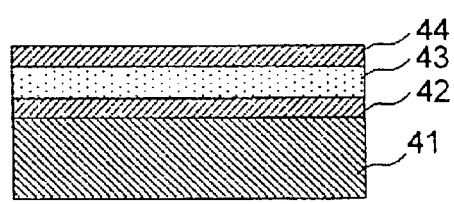
FIGS. 3(a)–(e) are schematic sectional views showing the steps of manufacturing an electric capacitance type acceleration sensor in the second embodiment of the present invention.

Next, a silicon oxide film 43 to be a sacrificial film is formed on the silicon substrate 41, and a polysilicon film (low resistance layer) 44 in which impurities for lowering the resistance of a fixed electrode 45 are doped is formed on the silicon oxide film 43 (FIG. 3(a)).

Figure 3B:
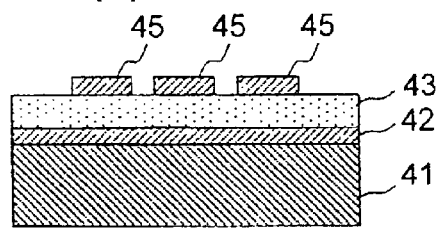

The low resistance layer 44 is etched by using the second photoresist as a mask (not shown) patterned in a predetermined shape, and the second photoresist is removed by plasma ashing to form a fixed electrode 45 (FIG. 3(b)).

Figure 3C:
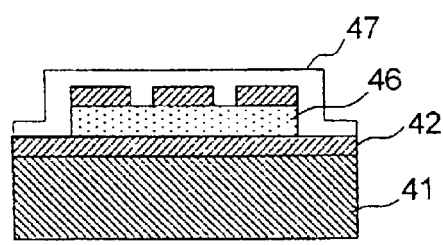
Figure 3D:
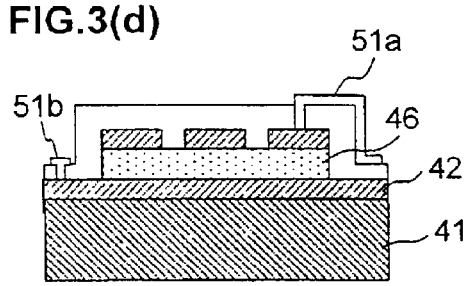
Figure 3E:
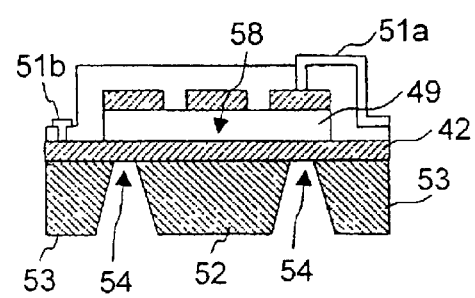

The peripheral part of the silicon oxide film 43 is etched by using the third photoresist as a mask (not shown) patterned in a predetermined shape, and the third photoresist is removed by plasma ashing to form a gap pattern 46, on which a silicon nitride film 47 is formed (FIG. 3(c)).

The silicon nitride film 47 is etched by using the fourth photoresist as a mask (not shown) patterned in a predetermined shape to form a piercing pattern for connecting the fixed electrode 45 and a movable electrode 58 to each of the metal wiring on the upper layer thereof, and to form the metal film. Then the metal film is etched by using the fifth photoresist as a mask (not shown) patterned in a predetermined shape, and the fifth photoresist is removed to form the metal wiring and pad patterns 51a and 51b (FIG. 3(d)).

Then a CVD oxide film is formed on the rear surface of the silicon substrate 41 and etched by using the sixth photoresist as a mask (not shown) patterned in a predetermined shape, and the sixth photoresist is removed. And then the silicon substrate 41 is etched anisotrophically by KOH solution from the rear surface of the silicon substrate by using the patterned CVD oxide film as a mask to form a weight part 52, a beam part 54, a supporting part 53 and the movable electrode 58. Using the KOH solution, the etching stops automatically with the p-type low resistance layer 42 as known well.

Finally, a gap (hollow layer) 49 is formed by removing the gap pattern (sacrificial film) 46 by a hydrofluoric acid solution from the rear surface of the silicon substrate 41. Thereby an electric capacitance type acceleration sensor according to this embodiment is completed (FIG. 3(e)).

According to the second embodiment as described above, since a boron ion is implanted only into the part 26 to be a beam part and the part 27 to be a movable part by using a predetermined resist pattern and the like in the step of forming a p-type low resistance layer on the surface of an n-type single crystal silicon to be a flexible substrate and in the step of an ion implantation of a boron and the like as impurities, in order to form the weight part, the beam part and the movable electrode at the same time in the final stage, the silicon etching does not become necessary and the steps becomes further simplified, compared with the steps in the first embodiment.

The art publicly known used in a semiconductor manufacturing process can be adopted as the photoresist method, the etching method and the like in the manufacturing method in the first and second embodiments of the present invention. Also, a silicon nitride, a silicon oxide, an aluminum, an aluminum oxide and the like, which are used in the conventional semiconductor manufacturing process, as well as a single crystal silicon and a polycrystalline silicon (polysilicon) can be adopted as the material of the acceleration sensor in the present invention.

Although the preferred embodiment of the present invention has been described referring to the accompanying drawings, the present invention is not restricted to such examples. It is evident to those skilled in the art that the present invention may be modified or changed within a technical philosophy thereof and it is understood that naturally these belong to the technical philosophy of the present invention.

What is claimed is:

1. A method for manufacturing an electric capacitance type acceleration sensor comprising the steps of: forming a p-type low resistance layer for diffusing a boron ion thermally by implanting the boron ion into the surface of a silicon substrate;

etching the p-type low resistance layer to leave a beam part and a part to be a movable electrode;

forming a silicon oxide layer to be a sacrificial film, a fixed electrode layer and a silicon nitride film layer on the surface of the silicon substrate;

etching anisotrophically from the rear surface of the silicon substrate by KOH solution making the p-type low resistance layer stop etching; and forming a hollow layer by removing the silicon oxide film by using a hydrofluoric acid solution from the rear surface of the silicon substrate.

2. A method for manufacturing an electric capacitance type acceleration sensor according to claim 1 wherein the silicon substrate is an n-type single crystal silicon.

3. A method for manufacturing an electric capacitance type acceleration sensor according to claim 1 wherein the silicon substrate is a polysilicon substrate.

4. A method for manufacturing an electric capacitance type acceleration sensor comprising the steps of: forming a p-type low resistance layer for diffusing a boron ion thermally by implanting the boron ion into a beam part and a part to be a movable electrode by patterning on the surface of a silicon substrate;

forming a silicon oxide layer to be a sacrificial film, a fixed electrode layer and a silicon nitride film layer on the surface of the silicon substrate;

etching anisotrophically from the rear surface of the silicon substrate by KOH solution making the p-type low resistance layer stop etching; and forming a hollow layer by removing the silicon oxide film by using a hydrofluoric acid solution from the rear surface of the silicon substrate.

5. A method for manufacturing an electric capacitance type acceleration sensor according to claim 4 wherein the silicon substrate is an n-type single crystal silicon.

6. A method for manufacturing an electric capacitance type acceleration sensor according to claim 4 wherein the silicon substrate is a polysilicon substrate.

* * * * *